(12) United States Patent
Young et al.

(10) Patent No.: US 8,284,812 B2
(45) Date of Patent: Oct. 9, 2012

(54) RESONANTLY PUMPED TM DOPED CYRSTALLINE LASERS

(75) Inventors: York E. Young, Amherst, NH (US); Evan P. Chicklis, Amherst, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 294 days.

(21) Appl. No.: 12/644,530

(22) Filed: Dec. 22, 2009

(65) Prior Publication Data

US 2011/0150011 A1 Jun. 23, 2011

(51) Int. Cl.
*H01S 3/091* (2006.01)
*H01S 3/092* (2006.01)
(52) U.S. Cl. .......................................... 372/70
(58) Field of Classification Search ............. 372/70
See application file for complete search history.

(56) References Cited

U.S. PATENT DOCUMENTS 7,298,768 B1 * 11/2007 Jiang ............................... 372/40
2003/0063884 A1 * 4/2003 Smith et al. ................... 385/129

OTHER PUBLICATIONS

Pruessner, Marcel W. et al., "InP-Based Optical Waveguide MEMS Switches With Evanescent Coupling Mechanism", Journal of Microelectromechanical Systems, Oct. 2005, pp. 1070-1081, vol. 14, No. 5.

* cited by examiner

*Primary Examiner* — Patrick Stafford
(74) *Attorney, Agent, or Firm* — Maine Cernota & Rardin; David A. Rardin

(57) ABSTRACT

A resonantly pumped, trivalent thulium ion (Tm3+) doped, crystal laser with improved efficiency is disclosed. Embodiments are pumped from the 3H6 ground state manifold to the 1st excited 3F4 state manifold by photons with wavelengths between 1.4 and 2.2 microns and laser wavelengths ranging from 1.5 to 2.4 microns arising from 3F4 to 3H6 transitions ensue, with output wavelengths dependant upon the choice of pump wavelength, crystalline host, and resonator optics.

20 Claims, 5 Drawing Sheets

300

DIODE LASER 305

FIBER LASER 310

SOLID STATE LASER 315

PUMP SOURCE

400

405
FIBER OPTIC

410
LENS DUCT

415
DISCRETE LENSES

DELIVERY

RESONANTLY PUMPED TM DOPED CYRSTALLINE LASERS

FIELD OF THE INVENTION

The invention relates to a resonantly pumped, trivalent thulium ion (Tm3+) doped crystal laser source providing enhanced efficiency.

BACKGROUND OF THE INVENTION

Lasers operating with a wavelength near 2 microns are useful in many military and medical applications; they often utilize trivalent thulium ion (Tm3+) doped crystals as their optical gain medium. Traditionally, these are pumped by 0.7 to 0.8 micron light, exciting the Tm ions from the 3H6 ground state manifold to the 2nd excited state 3H4 manifold (FIG. 1, 105). Cross relaxation can result in a "two for one" excitation of the 3F4 upper lasing level, wherein one pump photon leads to two excitations, effectively doubling the otherwise 40% Stokes efficiency. This cross relaxation mechanism itself however manifests a <100% efficiency which is dependent upon the Tm3+ dopant concentration. Typical values for this cross relaxation mechanism are ~70%, leading to an effective Stokes efficiency of ~56% (=2×0.4×0.7). This leads to substantial waste heat, and thermal lensing, which is especially deleterious for high power applications.

What is needed, therefore, are techniques for more efficient generation of ~2 micron light in Tm3+ lasers.

SUMMARY OF THE INVENTION

The invention provides a more efficient (Stokes factor approximately 80%), resonantly pumped, Tm3+ doped, crystal laser for use in applications including countermeasures. Embodiments are pumped from the 3H6 ground state manifold to the 1st excited 3F4 state manifold by photons with wavelengths between 1.4 and 2.2 microns, depending upon the choice of crystalline host (see FIG. 1, 110). The improved Stokes efficiency increases the optical to optical conversion efficiency and as well reduces the waste heat and thermal lensing, enabling greater power scaling for the same laser architecture.

Embodiments provide a resonantly-pumped laser apparatus comprising a pump source producing at least a first wavelength of light; a coupling to couple the at least a first wavelength of light; and a resonator receiving the at least a first wavelength of light, the resonator comprising an input coupler/high reflector (HR), a trivalent thulium ion (Tm3+) doped crystal, and an output coupler (OC); wherein a laser-generated light source is pumped from a 3H6 ground state manifold to a first excited 3F4 state manifold generating at least a second wavelength of light. In another embodiment, the pump source comprises a fiber laser. In another embodiment, the pump source comprises a diode laser. In another embodiment, the pump source comprises a solid state laser. In another embodiment, the pump source comprises at least two of a fiber laser, a diode laser, and a solid state laser. In another embodiment, the coupling comprises fiber. In another embodiment, the coupling comprises lens ducts. In another embodiment, the coupling comprises free space coupling. In another embodiment, the geometry of pumping is side-pumped. In another embodiment, the geometry of pumping is end-pumped. In another embodiment, the at least a first wavelength comprises two pump wavelengths. In another embodiment, the at least a first wavelength pump light is polarized for pumping a crystalline axis. In another embodiment, the at least a first wavelength pump light comprises two wavelengths having orthogonal polarization states. Another embodiment further comprises a Q-switch. In another embodiment, the laser operates in a pulsed mode wherein the Q-switch is an active Q-switch. In another embodiment, at least one of the OC and the HR comprises a free-standing optic. In another embodiment, at least one of the OC and the HR comprises a coating on Tm3+ host crystal. Another embodiment comprises a crystalline host selected from the group consisting of YALO, YAG, LuAG, YLF, and YSAG.

Other embodiments provide a resonantly-pumped, laser-generated, light source apparatus comprising a pump source producing at least a first wavelength of light; a coupling to couple the at least a first wavelength of light; and a resonator receiving the at least a first wavelength of light comprising an input coupler/high reflector (HR), a trivalent thulium ion (Tm3+) doped crystal, and an output coupler (OC), wherein the resonator is quasi-monolithic having at least one air gap; wherein the laser-generated light source is pumped from a 3H6 ground state manifold to a first excited 3F4 state manifold by photons with wavelengths between about approximately 1.4 microns and about approximately 2.2 microns, thereby generating at least a second wavelength of quasi-continuous wave light.

Yet other embodiments provide a laser system comprising a pump source producing at least a first wavelength of light; a coupling to couple the at least a first wavelength of light; and a resonator receiving the at least a first wavelength of light comprising an input coupler/high reflector (HR), a trivalent thulium ion (Tm3+) doped crystal, a passive Q-switch, and an output coupler (OC), wherein concentration of doping of the Tm3+ doped crystal is between about approximately 0.5% and about approximately 24%; wherein the laser-generated light source is pumped from a 3H6 ground state manifold to a first excited 3F4 state manifold generating at least a second wavelength of light.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Embodiments comprise a pump source with wavelengths between 1.4 and 2.2 microns. For embodiments, the pump source is a fiber laser, a diode laser, a solid state laser, or some combination of these. The coupling of this pump light to the trivalent thulium ion (Tm3+) doped crystal for embodiments is achieved via fiber coupling, lens ducts, and/or free space coupling via bulk optics in either a side- or end-pumped geometry. In embodiments, the pump light is polarized for pumping a particular crystalline axis, or unpolarized in others. Two different pump wavelengths with orthogonal polarization states may be used in embodiments to pump two different crystalline axes in a biaxial host crystal. The laser resonator comprises an input coupler/high reflector (HR), the Tm3+ doped crystal, and an output coupler (OC). The laser resonator output wavelength may range from 1.5 to 2.4 microns. Embodiments exist wherein the laser contains a Q-switch and embodiments exist wherein the laser does not contain a Q-switch. For embodiments, the laser is operated continuous wave (CW), or pulsed, or quasi CW (both pulsed and CW modes). For pulsed, the Q-switch is an active Q-switch (acousto-optic, electro-optic, etc.) or it may be a passive Q-switch. In embodiments, the HR is one or more free standing optics or simply a coating placed upon the Tm3+ crystal. The same holds true for the OC. The Tm3+ doped crystal has a Tm concentration between 0.5 and 24 (%) in the embodiments. The host crystal may be any acceptable crystalline host such as, but not limited to, YALO, YAG, LuAG, YLF, YSAG, etc. Embodiments exist wherein the host crystal has undoped regions on its input and/or output faces, and embodiments exist wherein the host crystal does not have undoped regions on its input and/or output faces. A monolithic arrangement of all elements is provided for embodiments as are quasi monolithic arrangements with one or more air gaps and one or more monolithic subsections.

Figure 1:
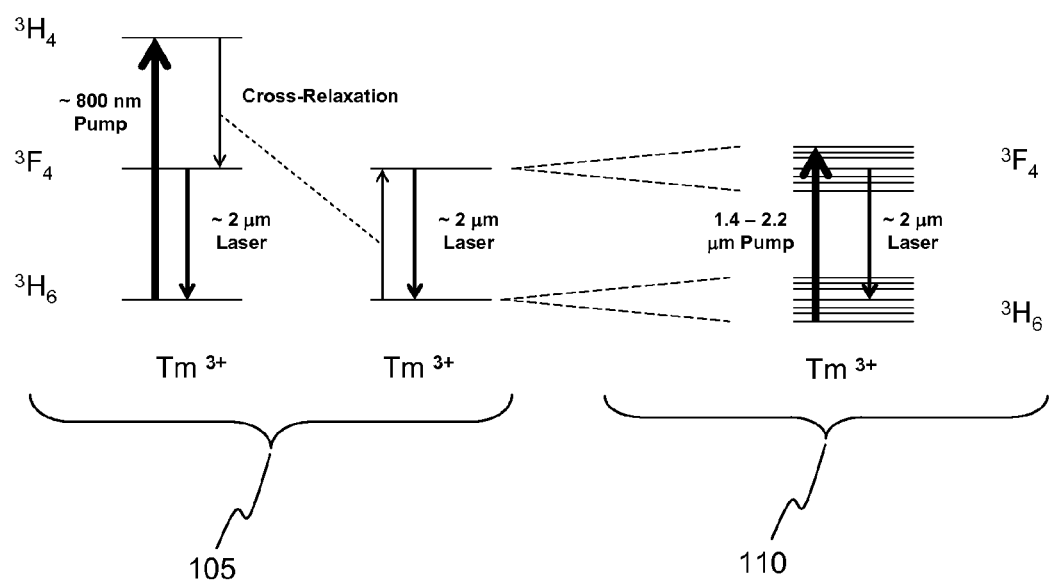
FIG. 1 is an energy level diagram for Tm3+, showing traditional pumping involving cross relaxation and illustrating resonant pumping configured in accordance with one embodiment of the present invention.

FIG. 1 depicts Tm3+ energy levels 100. FIG. 1 includes an energy level diagram for Tm3+ showing traditional pumping 105 involving cross relaxation. FIG. 1 further depicts an energy level diagram for Tm3+ illustrating resonant pumping 110 in accordance with embodiments of the invention.

Figure 2:
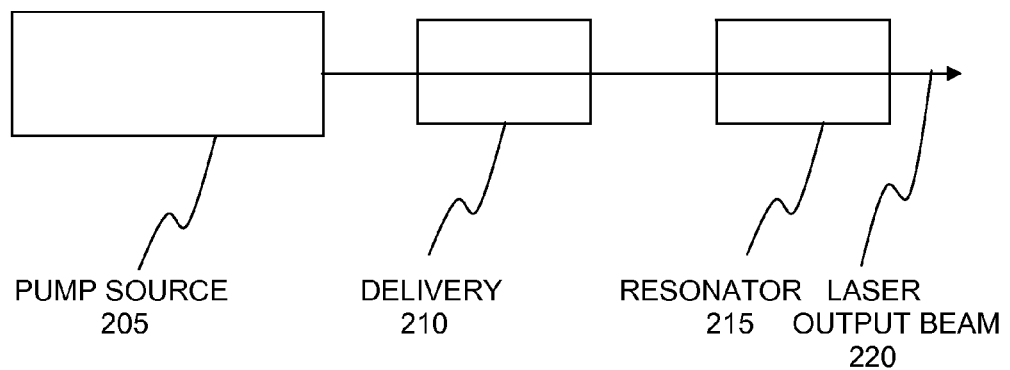
FIG. 2 is a block diagram illustrating laser components configured in accordance with one embodiment of the present invention.

FIG. 2 depicts a block diagram illustrating laser components 200. They comprise pump laser source 205, delivery component 210, and resonator 215 producing laser output beam 220. Source wavelength is 1.4 μm to 2.2 μm.

Figure 3:
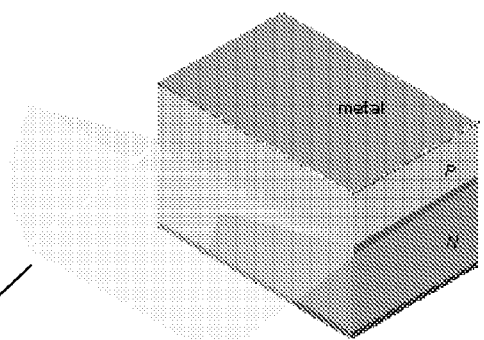
FIG. 3 is a block diagram illustrating laser pump sources configured in accordance with one embodiment of the present invention.
Figure 3:
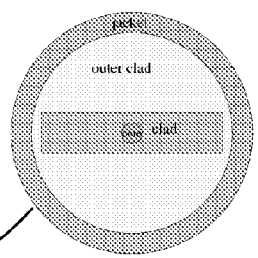
Figure 3:
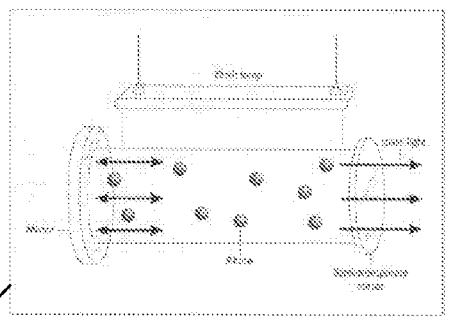

FIG. 3 is a block diagram illustrating laser pump source embodiments 300. They comprise sources including, but not limited to, diode laser 305, fiber laser 310, and solid state laser 315.

Figure 4:
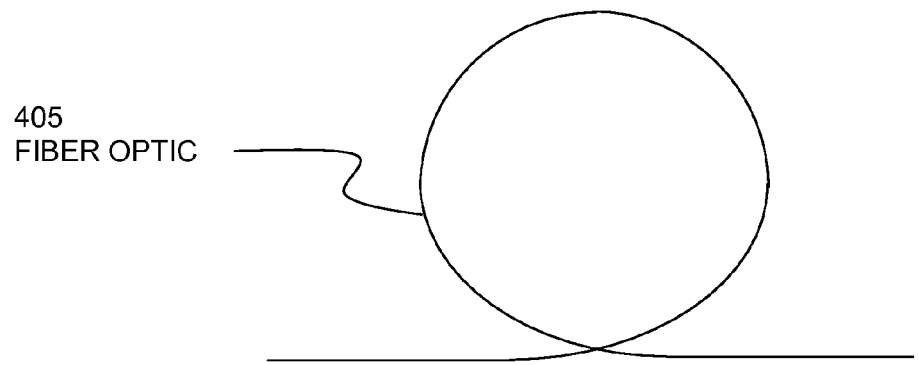
FIG. 4 is a block diagram illustrating pump light delivery techniques configured in accordance with one embodiment of the present invention.
Figure 4:
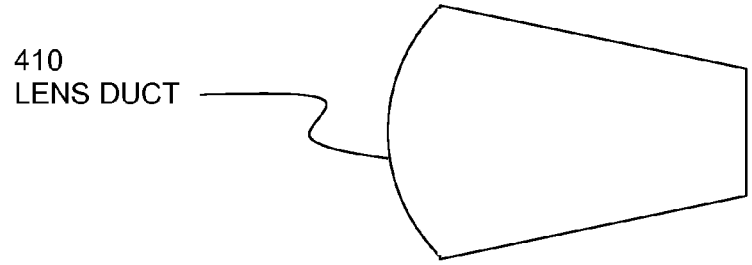
Figure 4:
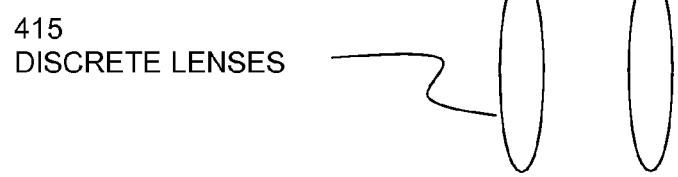

FIG. 4 is a block diagram illustrating delivery technique embodiments 400. They comprise couplings including, but not limited to, optical fiber 405, lens duct 410, and one or more discrete lenses 415.

Figure 5:
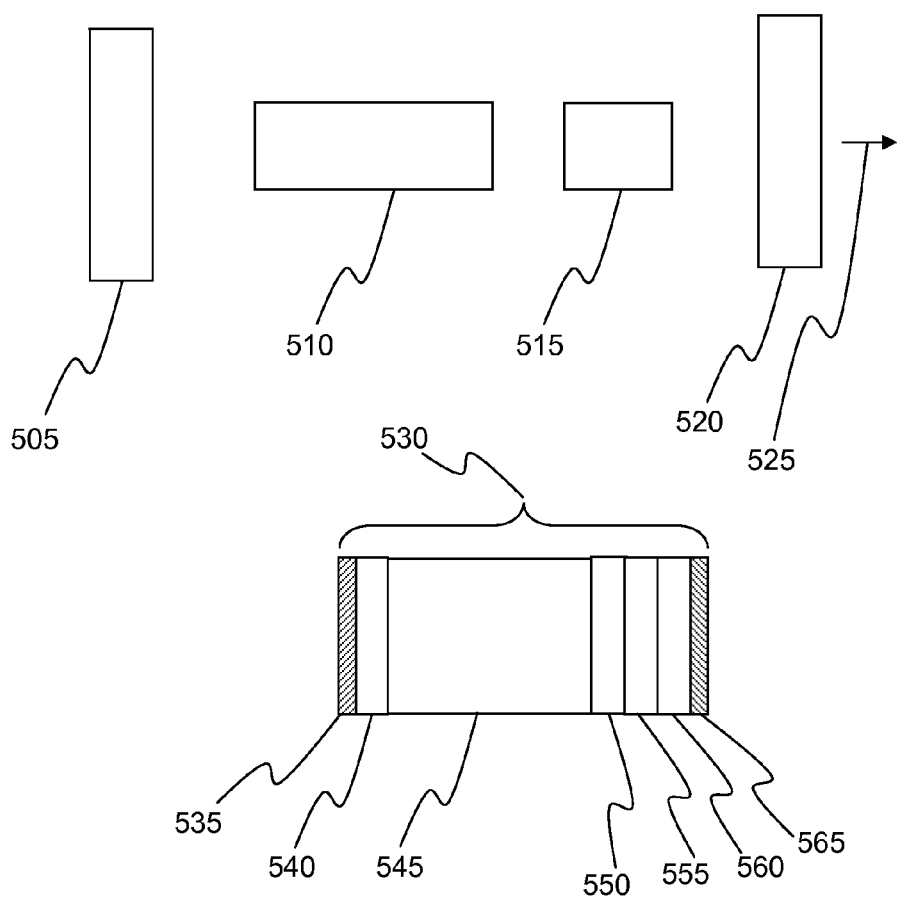
FIG. 5 is a block diagram illustrating resonator configuration in accordance with two embodiments of the present invention.

FIG. 5 is a block diagram illustrating resonator configuration embodiments 500. Components comprise input coupler/High reflector (HR) 505, Tm3+ crystal 510, Q-switch 515, and output coupler (OC) 520. Output 525 wavelength is 1.5 μm to 2.4 μm. Resonator structure 530 depicts components together. Similarly, components comprise HR with coating 535, undoped host 540, 550 and 560, Tm3+ crystal 545, Q-switch 555, and OC with coating 565. Various iterations of air gaps and monolithic subsections are implemented in various embodiments.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A resonantly-pumped laser apparatus comprising:
a pump source producing at least a first wavelength of light;
a coupling to couple said at least a first wavelength of light; and
a resonator receiving said at least a first wavelength of light, said resonator comprising an input coupler/high reflector (HR), a trivalent thulium ion (Tm3+) doped crystal, and an output coupler (OC);
wherein a laser-generated light source is pumped from a 3H6 ground state manifold to a first excited 3F4 state manifold generating at least a second wavelength of light.

2. The apparatus of claim 1 wherein said pump source comprises a fiber laser.

3. The apparatus of claim 1 wherein said pump source comprises a diode laser.

4. The apparatus of claim 1 wherein said pump source comprises a solid state laser.

5. The apparatus of claim 1 wherein said pump source comprises at least two of a fiber laser, a diode laser, and a solid state laser.

6. The apparatus of claim 1 wherein said coupling comprises fiber.

7. The apparatus of claim 1 wherein said coupling comprises lens ducts.

8. The system of claim 1 wherein said coupling comprises free space coupling.

9. The apparatus of claim 1 wherein geometry of pumping is side-pumped.

10. The apparatus of claim 1 wherein geometry of pumping is end-pumped.

11. The apparatus of claim 1 wherein said at least a first wavelength comprises two pump wavelengths.

12. The apparatus of claim 1 wherein said at least a first wavelength pump light is polarized for pumping a crystalline axis.

13. The apparatus of claim 1 wherein said at least a first wavelength pump light comprises two wavelengths having orthogonal polarization states.

14. The apparatus of claim 1, further comprising a Q-switch.

15. The apparatus of claim 14 wherein said laser operates in a pulsed mode wherein said Q-switch is an active Q-switch.

16. The apparatus of claim 1 wherein at least one of said OC and said HR comprises a free-standing optic.

17. The apparatus of claim 1 wherein at least one of said OC and said HR comprises a coating on Tm3+host crystal.

18. The apparatus of claim 1 comprising a crystalline host selected from the group consisting of YALO, YAG, LuAG, YLF, and YSAG.

19. A resonantly-pumped, laser-generated, light source apparatus comprising:
a pump source producing at least a first wavelength of light;
a coupling to couple said at least a first wavelength of light; and
a resonator receiving said at least a first wavelength of light comprising an input coupler/high reflector (HR), a trivalent thulium ion (Tm3+) doped crystal, and an output coupler (OC), wherein said resonator is quasi-monolithic having at least one air gap;
wherein said laser-generated light source is pumped from a 3H6 ground state manifold to a first excited 3F4 state manifold by photons with wavelengths between about approximately 1.4 microns and about approximately 2.2 microns, thereby generating at least a second wavelength of quasi-continuous wave light.

20. A laser system comprising:

a pump source producing at least a first wavelength of light;

a coupling to couple said at least a first wavelength of light; and a resonator receiving said at least a first wavelength of light comprising an input coupler/high reflector (HR), a trivalent thulium ion (Tm3+) doped crystal, a passive Q-switch, and an output coupler (OC), wherein concentration of doping of said Tm3+doped crystal is between about approximately 0.5% and about approximately 24%;

wherein said laser-generated light source is pumped from a 3H6 ground state manifold to a first excited 3F4 state manifold generating at least a second wavelength of light.

* * * * *